(12) United States Patent
Kondo et al.

(10) Patent No.: US 12,372,012 B2
(45) Date of Patent: Jul. 29, 2025

(54) ROTATING-MACHINE CASING SUPPORT STRUCTURE AND ROTATING MACHINE

(71) Applicant: MITSUBISHI HEAVY INDUSTRIES, LTD., Tokyo (JP)

(72) Inventors: Makoto Kondo, Tokyo (JP); Katsuhisa Hamada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/686,499

(22) PCT Filed: Dec. 13, 2022

(86) PCT No.: PCT/JP2022/045777
§ 371 (c)(1),
(2) Date: Feb. 26, 2024

(87) PCT Pub. No.: WO2023/162412
PCT Pub. Date: Aug. 31, 2023

(65) Prior Publication Data
US 2024/0352874 A1    Oct. 24, 2024

(30) Foreign Application Priority Data

Feb. 22, 2022 (JP) .................. 2022-025876

(51) Int. Cl.
*F01D 25/28* (2006.01)
*F01D 25/14* (2006.01)
*F01D 25/26* (2006.01)

(52) U.S. Cl.
CPC ............. *F01D 25/28* (2013.01); *F01D 25/14* (2013.01); *F01D 25/26* (2013.01); *F05D 2220/31* (2013.01)

(58) Field of Classification Search
CPC .......... F01D 25/28; F01D 25/14; F01D 25/26; F05D 2220/31
See application file for complete search history.

(56) References Cited

U.S. PATENT DOCUMENTS 3,773,431 A * 11/1973 Bellati ................. F01D 25/28
415/213.1
2012/0282089 A1 11/2012 Predmore et al.
(Continued)

FOREIGN PATENT DOCUMENTS

DE   112020004297 T5   6/2022
JP        S53-133010 U  10/1978
(Continued)

OTHER PUBLICATIONS

Office Action dated Jan. 21, 2025, issued in counterpart JP Application No. 2024-502850, with English translation. (11 pages).
(Continued)

*Primary Examiner* — Shafiq Mian
(74) *Attorney, Agent, or Firm* — WHDA, LLP

(57) ABSTRACT

According to one embodiment, the present invention provides a rotating-machine casing support structure including: a casing; a built-in component that is disposed inside an interior space of the casing at a lateral side of a rotor and that is supported by the casing; a protruding part that is provided so as to protrude laterally outside of the casing from a side of the casing; and a support part that supports the protruding part laterally outside of the casing.

10 Claims, 6 Drawing Sheets

AXIS AX DIRECTION
(AXIAL DIRECTION)

(56) References Cited

U.S. PATENT DOCUMENTS

| | | | | |
|---|---|---|---|---|
| 2016/0123173 | A1* | 5/2016 | Zheng | F01D 25/14 |
| | | | | 415/126 |
| 2019/0345843 | A1 | 11/2019 | Yanagisawa et al. | |
| 2022/0235674 | A1 | 7/2022 | Kondo et al. | |

FOREIGN PATENT DOCUMENTS

| | | |
|---|---|---|
| JP | S58-002401 A | 1/1983 |
| JP | H04-41906 A | 2/1992 |
| JP | 2006-105050 A | 4/2006 |
| JP | 4410651 B2 | 2/2010 |
| JP | 2012-112254 A | 6/2012 |
| JP | 2014-040795 A | 3/2014 |
| JP | 2017-141727 A | 8/2017 |
| JP | 2018-141374 A | 9/2018 |
| JP | 2021-042713 A | 3/2021 |

OTHER PUBLICATIONS

International Search Report dated Feb. 21, 2023, issued in counterpart Application No. PCT/JP2022/045777. (15 pages).
Notification Concerning Transmittal of International Preliminary Report on Patentability (Forms PCT/IB/326) issued in counterpart International Application No. PCT/JP2022/045777 mailed Sep. 6, 2024, with Forms PCT/IB/373, PCT/IB/338 and PCT/ISA/237. (16 pages).
Office Action dated Aug. 26, 2024, issued in counterpart DE Application No. 112022003086.0. (5 pages).

* cited by examiner

AXIS AX DIRECTION
(AXIAL DIRECTION)

AXIS AX DIRECTION
(AXIAL DIRECTION)

IV - IV

V - V

AXIS AX DIRECTION
(AXIAL DIRECTION)

ROTATING-MACHINE CASING SUPPORT STRUCTURE AND ROTATING MACHINE

TECHNICAL FIELD

The present disclosure relates to a rotary-machine casing support structure and a rotary machine.

The present application claims priority based on Japanese Patent Application No. 2022-025876 filed in Japan on Feb. 22, 2022, the contents of which are incorporated herein by reference.

BACKGROUND ART

In a rotary machine such as a steam turbine or a gas turbine, a protrusion portion called a cat foot is provided in a casing in which a rotating member (rotor or rotating blade) and a stationary member (blade ring or stator vane) are accommodated, and it is known that the casing is supported via the protrusion portion (cat foot). Specifically, a support member called a casing support is erected on the ground, and the casing is supported by placing a protrusion portion on a support interface surface of the casing support (for example, refer to PTL 1).

CITATION LIST

Patent Literature

[PTL 1] Japanese Patent No. 4410651

SUMMARY OF INVENTION

Technical Problem

In a rotary machine that is operated under a high temperature, such as a steam turbine or a gas turbine, various thermal deformations occur during operation of the turbine. For example, if a casing is deformed to warp in a vertical direction due to thermal deformation during operation of the steam turbine, a built-in component such as a blade ring, which is supported by the casing, also moves up and down inside the casing. As a result, the casing comes into contact with seal fins due to a vertical displacement difference with a rotor, or conversely, a clearance becomes excessive, so that shaft vibration or degradation in performance may occur. Therefore, it is desired to reduce a vertical displacement difference between the built-in component and the rotor.

In view of the above circumstances, an object of at least one embodiment of the present disclosure is to reduce a vertical displacement difference between a built-in component and a rotor in a rotary machine.

Solution to Problem (1) A rotary-machine casing support structure according to at least one embodiment of the present disclosure includes
 a casing,
 a built-in component that is disposed inside of an internal space of the casing at a lateral side of a rotor and that is supported by the casing,
 a protrusion portion that is provided to protrude laterally outside of the casing from a lateral side portion of the casing, and
 a support portion that supports the protrusion portion laterally outside of the casing.

(2) A rotary machine according to at least one embodiment of the present disclosure includes
 the rotary-machine casing support structure according to the above configuration in (1); and
 the rotor.

Advantageous Effects of Invention

According to at least one embodiment of the present disclosure, a vertical displacement difference between a built-in component and a rotor in a rotary machine can be reduced.

DESCRIPTION OF EMBODIMENTS

Figure 1:
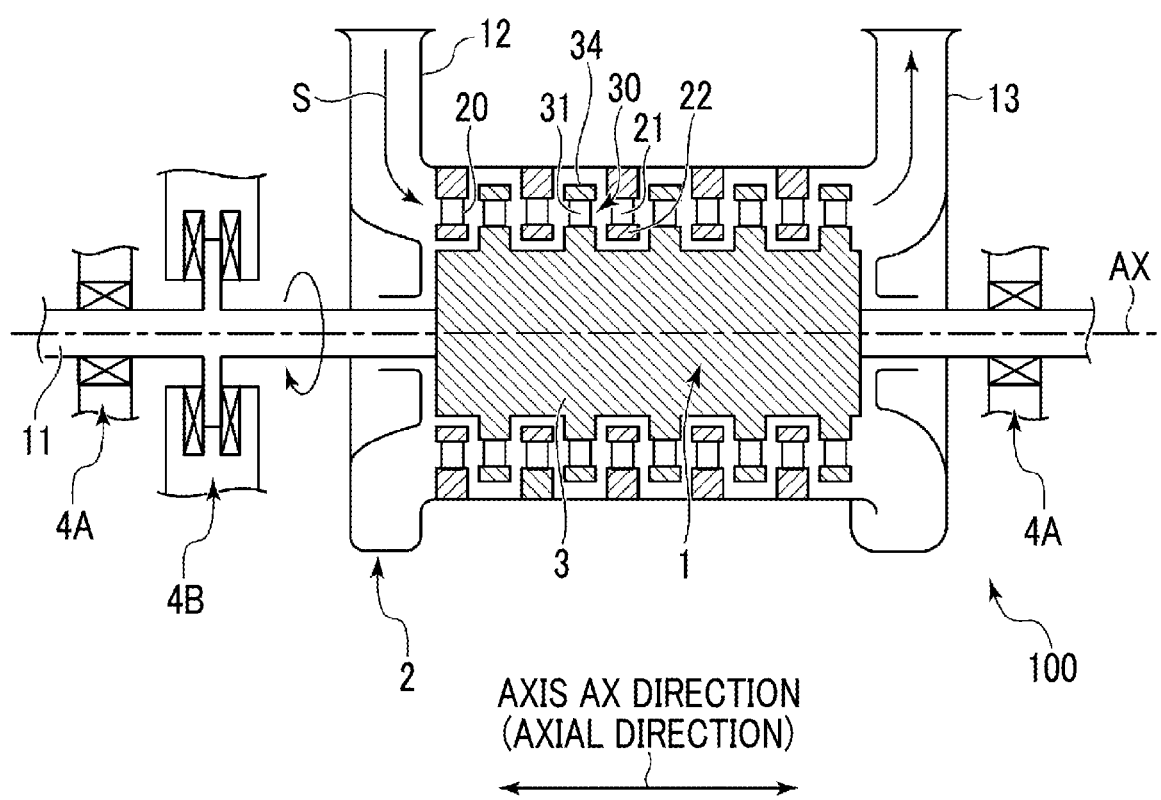
FIG. 1 is a schematic diagram showing a steam turbine as an example of a rotary machine.

Hereinafter, some embodiments of the present disclosure will be described with reference to the accompanying drawings. Dimensions, materials, shapes, relative arrangements, and the like of components described as embodiments or illustrated in the drawings are not intended to limit the scope of the present disclosure, but are merely explanatory examples.

For example, an expression representing a relative or absolute arrangement such as "in a certain direction", "along a certain direction", "parallel", "orthogonal", "center", "concentric", or "coaxial" does not strictly represent only such an arrangement, but also a tolerance or a state of being relatively displaced with an angle or a distance to the extent that the same function can be obtained.

For example, expressions such as "identical", "equal", and "homogeneous" indicating that things are in an equal state does not strictly represent only the equal state, but also a tolerance or a state where there is a difference to the extent that the same function can be obtained.

For example, an expression representing a shape such as a quadrangular shape or a cylindrical shape does not represent only a shape such as a quadrangular shape or a cylindrical shape in a geometrically strict sense, but also a shape including an uneven portion, a chamfered portion, and the like within a range in which the same effect can be obtained.

Meanwhile, the expressions "being provided with", "being prepared with", "comprising", "including", or "having" one component exclusive expressions excluding the presence of other components.

Steam Turbine 100

FIG. 1 is a schematic diagram showing a steam turbine as an example of a rotary machine. A steam turbine 100 as an example of the rotary machine is provided with a rotor 3 that extends along an axis AX direction, a casing 2 that covers the rotor 3 from an outer peripheral side, a journal bearing 4A that rotatably supports an shaft end 11 of the rotor 3 around the axis AX, and a thrust bearing 4B.

The rotor 3 includes a rotary shaft 1 that extends along the axis AX and a plurality of rotating blades 30 that are provided on an outer peripheral surface of the rotary shaft 1. The plurality of rotating blades 30 are arranged at a regular interval in a circumferential direction of the rotary shaft 1. Rows of the plurality of rotating blades 30 are also arranged at a regular interval in the axis AX direction. The rotating blade 30 includes a rotating blade main body 31 and a rotating blade shroud 34. The rotating blade main body 31 protrudes toward a radially outer side from an outer peripheral surface of the rotor 3. The rotating blade main body 31 has an airfoil-shaped cross section when viewed from a radial direction. The rotating blade shroud 34 is provided at a tip portion (end portion of radially outer side) of the rotating blade main body 31.

A casing 2 has a substantially tubular shape that covers the rotor 3 from the outer peripheral side. A steam supply pipe 12 for taking in steam S is provided on one side of the casing 2 in the axis AX direction. A steam discharge pipe 13 for discharging the steam S is provided on the other side of the casing 2 in the axis AX direction. The steam flows from the one side toward the other side in the axis AX direction inside the casing 2. In the following description, a direction in which steam flows is simply referred to as a "flow direction". Furthermore, a side where the steam supply pipe 12 is located when viewed from the steam discharge pipe 13 will be referred to as an upstream side in the flow direction, and a side where the steam discharge pipe 13 is located when viewed from the steam supply pipe 12 will be referred to as a downstream side in the flow direction.

Rows of a plurality of stator vanes 20 are provided on an inner peripheral surface of the casing 2. The stator vane 20 includes a stator vane main body 21 and a stator vane shroud 22. The stator vane main body 21 is a vane-shaped member attached to a blade ring (blade ring 212, a high-pressure turbine blade ring 222, and a medium-pressure turbine blade ring 232), which will be described later. Further, the stator vane shroud 22 is provided at a tip portion (end portion of radially inner side) of the stator vane main body 21. As in the rotating blade 30, the plurality of stator vanes 20 are arrayed along the circumferential direction and the axis AX direction on the inner peripheral surface. The rotating blades 30 are arranged to enter regions between the plurality of adjacent stator vanes 20. That is, the stator vane 20 and the rotating blade 30 extend in a direction intersecting with the flow direction of the steam (radial direction with respect to the axis AX).

In the following description, the extending direction of the rotor 3, that is, the axis AX direction is will be simply referred to as an axial direction. In addition, in the following description, the radial direction with respect to the axis AX is also simply referred to as a radial direction, and the circumferential direction with respect to the axis AX is also simply referred to as a circumferential direction.

Figure 2:
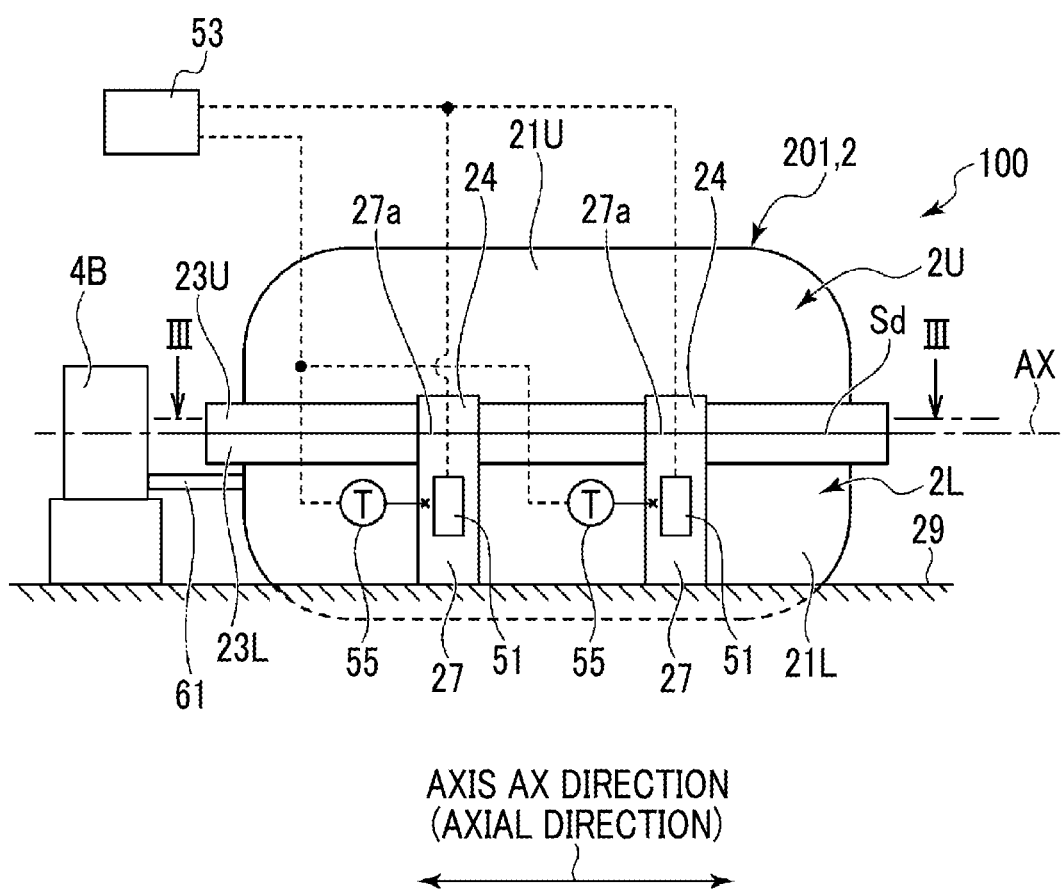
FIG. 2 is a schematic diagram showing an appearance of a steam turbine according to some embodiments as viewed from a lateral side.

FIG. 2 is a schematic diagram showing an appearance of the steam turbine 100 according to some embodiments as viewed from a lateral side. In FIG. 2, the rotor 3 and the journal bearing 4A are not shown. As shown in FIG. 2, in the steam turbine 100 according to some embodiments, the casing 2 is divided into upper and lower parts, the upper half being a casing upper-half portion 2U, and the lower half being a casing lower-half portion 2L. The casing upper-half portion 2U and the casing lower-half portion 2L are plane-symmetrical with respect to a horizontal division surface Sd spreading in a horizontal plane (however, a pipe portion is excluded). The casing upper-half portion 2U has a semi-cylindrical upper-half casing main body 21U and an upper-half flange portion 23U protruding outward from an end edge of the upper-half casing main body 21U. Similarly, the casing lower-half portion 2L includes a semi-cylindrical lower-half casing main body 21L and a lower-half flange portion 23L protruding outward from an end edge of the lower-half casing main body 21L. The casing upper-half portion 2U and the casing lower-half portion 2L are fastened and fixed by bolts, nuts, and the like that are not illustrated, in a state in which a lower surface of the upper-half flange portion 23U and an upper surface of the lower-half flange portion 23L are brought into contact with each other within the horizontal division surface Sd.

In the steam turbine 100 according to some embodiments, a protrusion portion 24 is formed in the casing 2 to protrude laterally outside (radially outside) of the casing 2 from a lateral side portion of the casing 2. For example, in the example shown in FIG. 2, two protrusion portions 24 that are spaced apart from each other in the extending axis AX direction are provided on a lateral outer side of one side and on a lateral outer side of the other side of the casing upper-half portion 2U, respectively.

In the steam turbine 100 according to some embodiments, each of the four protrusion portions 24 is supported by a turbine pedestal 29 via an outer support portion 27, so that the casing 2 is supported by the turbine pedestal 29.

The steam S is supplied into the casing 2 configured as described above via the steam supply pipe 12 on the upstream side. While passing through the interior of the casing 2, the steam S alternately passes through a flow path composed of the stator vane 20 and the rotating blade 30. The stator vane 20 straightens a flow of the steam S, and the straightened steam S pushes the rotating blade 30 to apply a rotational force to the rotor 3. The rotational force of the rotor 3 is taken out from the shaft end 11 and is used to drive an external device (generator or the like). As the rotor 3 rotates, the steam S is discharged toward a subsequent device (condenser or the like) through the steam discharge pipe 13 on the downstream side.

The journal bearing 4A supports a load acting in the radial direction with respect to the axis AX. The journal bearings 4A are provided one by one in both ends of the rotor 3. The thrust bearing 4B supports a load acting in the axis AX direction. The thrust bearing 4B is provided only in an end portion on the upstream side of the rotor 3.

Figure 3A:
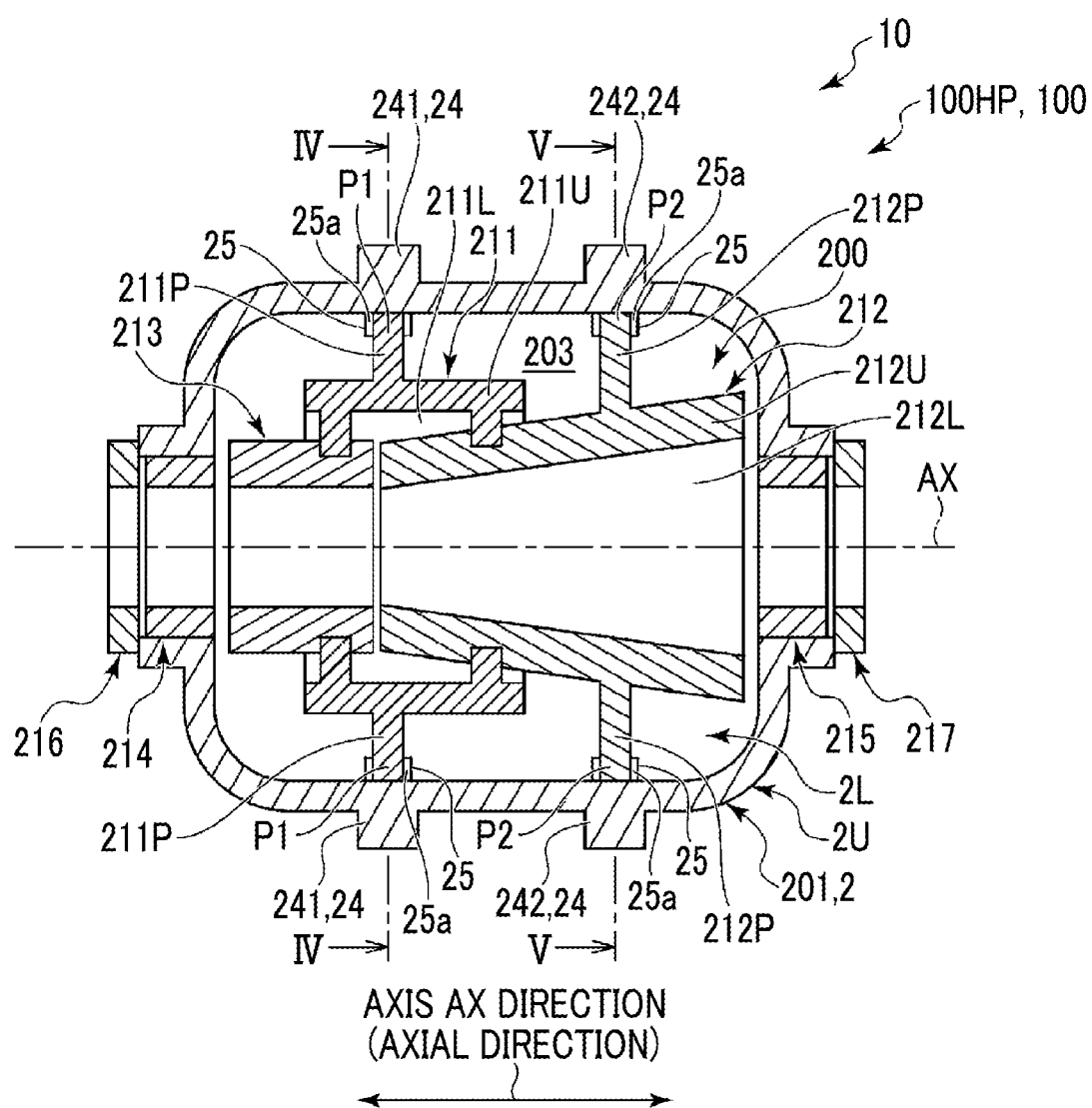
FIG. 3A is a schematic diagram showing a cross section of a high-pressure turbine as viewed from above as an example of the steam turbine according to some embodiments.

FIG. 3A is a diagram showing a schematic cross section of a high-pressure turbine 100HP as viewed from above as an example of the steam turbine 100 according to some embodiments, and is a diagram corresponding to a cross-sectional view taken along line III-III in FIG. 2.

Figure 3B:
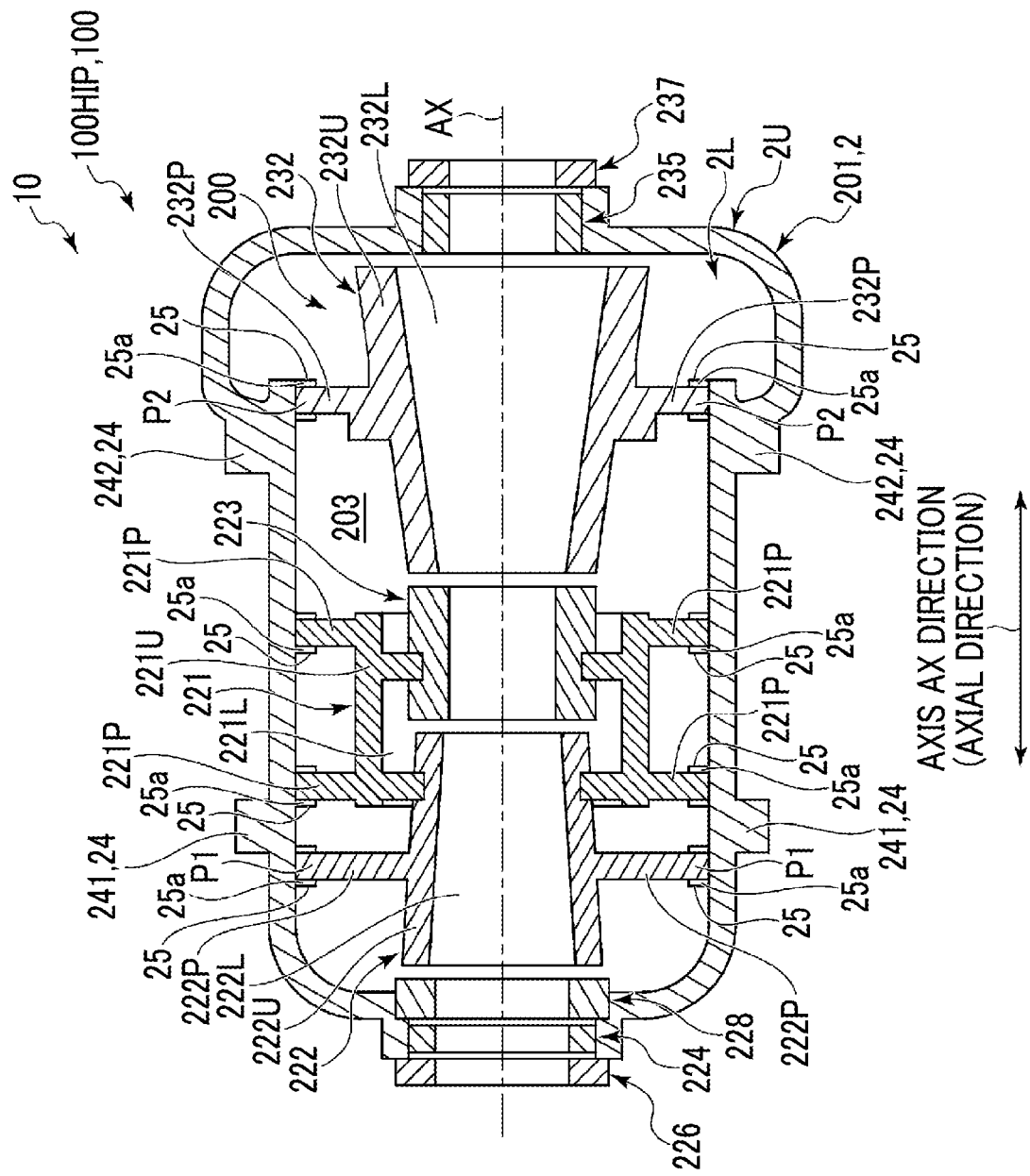
FIG. 3B is a schematic diagram showing a cross section of a high-and-medium-pressure turbine as viewed from above as another example of the steam turbine according to some embodiments.

FIG. 3B is a diagram showing a schematic cross section of a high-and-medium-pressure turbine 100HIP as viewed from above as another example of the steam turbine 100 according to some embodiments, and is a diagram corresponding to a cross-sectional view taken along line III-III in FIG. 2.

Figure 4:
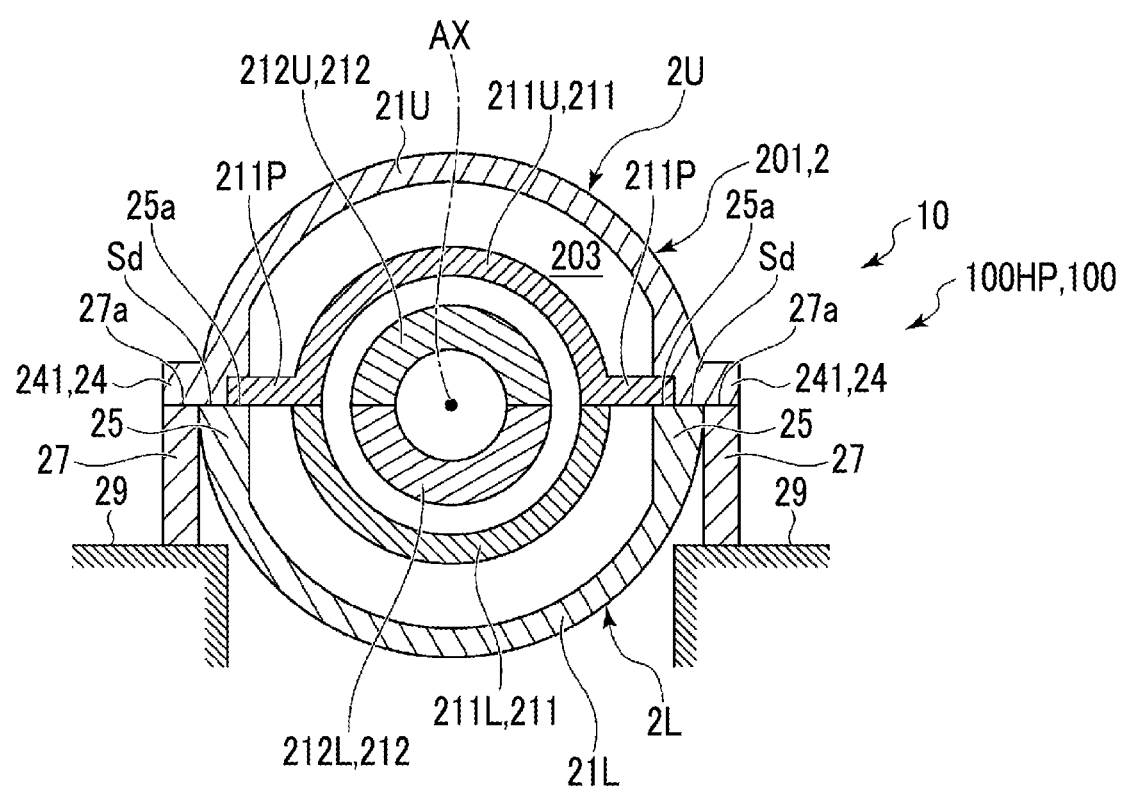
FIG. 4 is a cross-sectional view taken along line IV-IV of FIG. 3A.

FIG. 4 is a cross-sectional view taken along line IV-IV of FIG. 3A.

Figure 5:
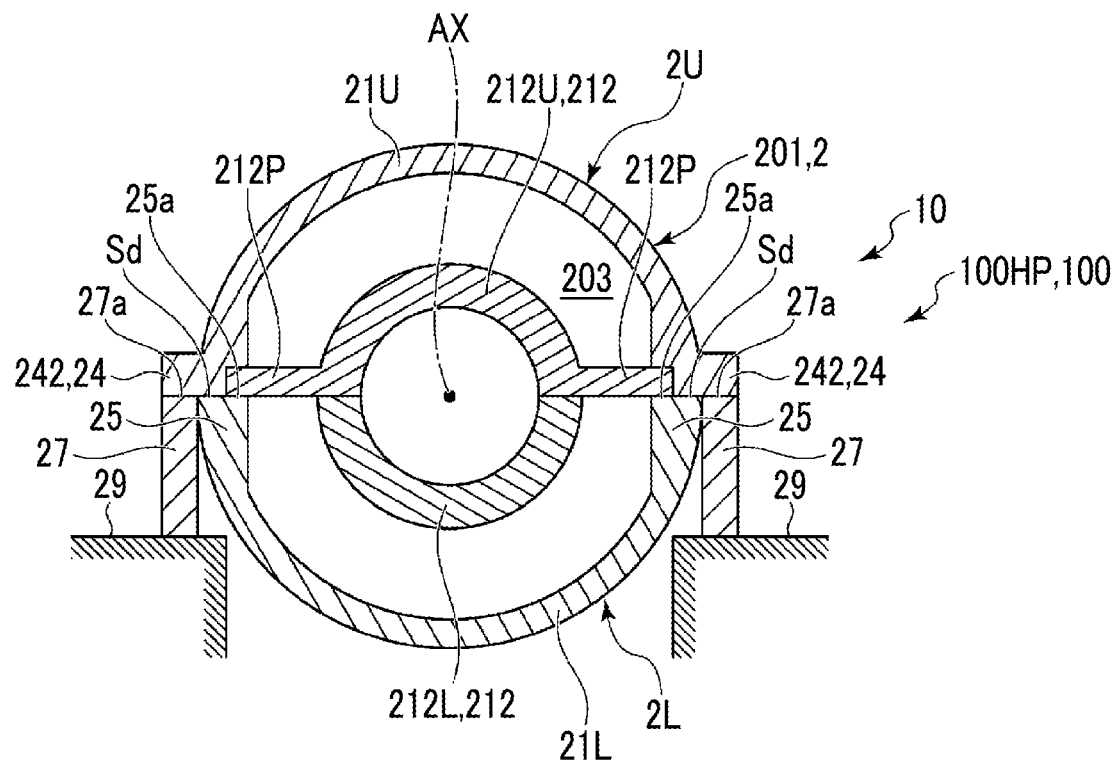
FIG. 5 is a cross-sectional view taken along line V-V of FIG. 3A.

FIG. 5 is a cross-sectional view taken along line V-V of FIG. 3A.

In addition, in FIGS. 3A to 5, the description of the rotor 3 and the rotating blade 30 attached to the rotor 3 is not shown.

In the following description, a turbine, in a case where the high-pressure turbine 100HP shown in FIG. 3A and the high-and-medium-pressure turbine 100HIP shown in FIG. 3B are not particularly distinguished, or in a case where the high-pressure turbine 100HP and the high-and-medium-pressure turbine 100HIP shown in FIG. 3B are collectively referred to are used, is simply referred to as a steam turbine 100.

As shown in FIGS. 3A to 5, the steam turbine 100 according to some embodiments is disposed in an internal space 203 of the casing 2 on a lateral side of the rotor 3, and is provided with a built-in component 200 that is supported by the casing 2.

In the steam turbine 100 according to some embodiments shown in FIGS. 3A to 5, the casing 2 is an external casing 201.

High-Pressure Turbine 100HP

In the high-pressure turbine 100HP shown in FIG. 3A, an internal casing 211, the blade ring 212, and a dummy ring 213 are provided as the built-in component 200 disposed in the internal space 203 of the casing 2 (external casing 201).

The high-pressure turbine 100HP shown in FIG. 3A is provided with an inlet-side inner gland 214 and an outlet-side inner gland 215. In the high-pressure turbine 100HP shown in FIG. 3A, the inlet-side inner gland 214 and the outlet-side inner gland 215 are respectively attached to an opening of an upstream end portion and of a downstream end portion of the casing 2 (external casing 201).

In general, the inlet-side inner gland 214 and the outlet-side inner gland 215 included in the high-pressure turbine 100HP shown in FIG. 3A are also included in the built-in component of the casing 2, but in the present specification, the built-in component disposed in the internal space 203 of the external casing 201 is simply referred to as a built-in component 200. In the present specification, the built-in component 200 does not include the inlet-side inner gland 214 and the outlet-side inner gland 215.

In addition, the high-pressure turbine 100HP shown in FIG. 3A has an inlet-side outer gland 216 attached to the upstream end portion of the casing 2 and an outlet-side outer gland 217 attached to the downstream end portion of the casing 2.

In the high-pressure turbine 100HP shown in FIG. 3A, the internal casing 211 includes an internal casing upper-half portion 211U and an internal casing lower-half portion 211L as shown in FIG. 4. The internal casing upper-half portion 211U and the internal casing lower-half portion 211L are connected by a fastening member (not shown) such as a bolt.

The internal casing upper-half portion 211U shown in FIG. 4 has an internal casing protrusion portion 211P that protrudes horizontally toward the radially outer side around the axis AX.

In the high-pressure turbine 100HP shown in FIG. 3A, the internal casing 211 holds the blade ring 212 and the dummy ring 213 on a radially inner side.

In the high-pressure turbine 100HP shown in FIG. 3A, the blade ring 212 includes a blade ring upper-half portion 212U and a blade ring lower-half portion 212L as shown in FIG. 4. The blade ring upper-half portion 212U and the blade ring lower-half portion 212L are connected to each other by a fastening member (not shown) such as a bolt.

The blade ring upper-half portion 212U shown in FIG. 4 has a blade ring protrusion portion 212P that protrudes horizontally toward the radially outer side around the axis AX.

In the high-pressure turbine 100HP shown in FIG. 3A, an inner support portion 25 for supporting the built-in component 200, which protrudes radially inward in the vicinity of the horizontal division surface Sd, is formed in the casing lower-half portion 2L of the external casing 201.

For example, in the example shown in FIG. 3A, two inner support portions 25 that are spaced apart from each other in the extending axis AX direction are provided on a lateral inner side (radially inner side) of one side and on a lateral inner side of the other side of the casing lower-half portion 2L, respectively.

The inner support portion 25 supports the internal casing protrusion portion 211P or the blade ring protrusion portion 212P from below, while an upper surface 25a of the inner support portion 25 comes into contact with a lower surface of the internal casing protrusion portion 211P or of the blade ring protrusion portion 212P.

High-and-Medium-Pressure Turbine 100HIP

In the high-and-medium-pressure turbine 100HIP shown in FIG. 3B, a high-pressure turbine internal casing 221, the high-pressure turbine blade ring 222, a first dummy ring 223, and the medium-pressure turbine blade ring 232 are provided as the built-in component 200 disposed in the internal space 203 of the casing 2 (external casing 201).

The high-and-medium-pressure turbine 100HIP shown in FIG. 3B includes a second dummy ring 228, a high-pressure-side inner gland 224, and a medium-pressure-side inner gland 235. In the high-and-medium-pressure turbine 100HIP shown in FIG. 3B, the second dummy ring 228, the high-pressure-side inner gland 224, and the medium-pressure-side inner gland 235 are attached to the opening of the upstream end portion and of the downstream end portion of the casing 2 (external casing 201).

In general, the second dummy ring 228, the high-pressure-side inner gland 224, and the medium-pressure-side inner gland 235 included in the high-and-medium-pressure turbine 100HIP shown in FIG. 3B are also included in the built-in component of the casing 2, but in the present specification as described above, the built-in component disposed in the internal space 203 of the external casing 201 is simply referred to as the built-in component 200. In the present specification, it is assumed that the built-in component 200 does not include the second dummy ring 228, the high-pressure-side inner gland 224, and the medium-pressure-side inner gland 235.

Further, in the high-and-medium-pressure turbine 100HIP shown in FIG. 3B, a high-pressure-side outer gland 226 attached to one end portion of the casing 2 provided with a high-pressure turbine section and a medium-pressure-side outer gland 237 attached to the other end portion of the casing 2 provided with a medium-pressure turbine section are included.

In the high-and-medium-pressure turbine 100HIP shown in FIG. 3B, the high-pressure turbine internal casing 221 includes an internal casing upper-half portion 221U and an internal casing lower-half portion 221L, similarly to the internal casing 211 of the high-pressure turbine 100HP shown in FIG. 4. The internal casing upper-half portion 221U and the internal casing lower-half portion 221L are connected by a fastening member (not shown) such as a bolt.

The internal casing upper-half portion 221U includes an internal casing protrusion portion 221P that protrudes horizontally toward the radially outer side around the axis AX.

In the high-and-medium-pressure turbine 100HIP shown in FIG. 3B, two internal casing protrusion portions 221P that are spaced apart from each other in the extending axis AX direction are provided on a lateral outer side of one side (radially outer side) and on a lateral outer side of the other side of the internal casing upper-half portion 221U, respectively.

In the high-and-medium-pressure turbine 100HIP shown in FIG. 3B, the high-pressure turbine internal casing 221 holds the high-pressure turbine blade ring 222 and the first dummy ring 223 on the radially inner side.

In the high-and-medium-pressure turbine 100HIP shown in FIG. 3B, the high-pressure turbine blade ring 222 includes a blade ring upper-half portion 222U and a blade ring lower-half portion 222L, similarly to the blade ring 212 of the high-pressure turbine 100HP shown in FIG. 4. The blade ring upper-half portion 222U and the blade ring lower-half portion 222L are connected to each other by a fastening member (not shown) such as a bolt.

The blade ring upper-half portion 222U has a blade ring protrusion portion 222P that protrudes horizontally toward the radially outer side around the axis AX.

In the high-and-medium-pressure turbine 100HIP shown in FIG. 3B, the medium-pressure turbine blade ring 232 includes a blade ring upper-half portion 232U and a blade ring lower-half portion 232L, similarly to the blade ring 212 of the high-pressure turbine 100HP shown in FIG. 4. The blade ring upper-half portion 232U and the blade ring lower-half portion 232L are connected to each other by a fastening member (not shown) such as a bolt.

The blade ring upper-half portion 232U has a blade ring protrusion portion 232P that protrudes horizontally toward the radially outer side around the axis AX.

In the high-and-medium-pressure turbine 100HIP shown in FIG. 3B, an inner support portion 25 for supporting the built-in component 200, which protrudes radially inward in the vicinity of the horizontal division surface Sd, is formed in the casing lower-half portion 2L of the external casing 201.

For example, in the example shown in FIG. 3B, four inner support portions 25 that are spaced apart from each other in the extending axis AX direction are provided on a lateral inner side (radially inner side) of one side and on a lateral inner side of the other side of the casing lower-half portion 2L, respectively.

The inner support portion 25 supports any one of the internal casing protrusion portion 221P, the blade ring protrusion portion 222P of the high-pressure turbine blade ring 222, or the blade ring protrusion portion 232P of the medium-pressure turbine blade ring 232, while the upper surface 25a of the inner support portion 25 comes into contact with any one of the lower surfaces of the internal casing protrusion portion 221P, the blade ring protrusion portion 222P of the high-pressure turbine blade ring 222, or the blade ring protrusion portion 232P of the medium-pressure turbine blade ring 232.

In a rotary machine that is operated under a high temperature, such as a steam turbine or a gas turbine, various thermal deformations occur during operation of the turbine. For example, if a casing 2 is deformed to warp in the vertical direction by the thermal deformation during operation of the steam turbine 100, a built-in component such as a blade ring, which is supported by the casing, also moves up and down inside the casing 2. As a result, the casing 2 comes into contact with seal fins (not shown) provided in the rotating blade shroud 34 due to a vertical displacement difference with a rotor 3, or conversely, a clearance becomes excessive, so that shaft vibration or degradation in performance may occur. Therefore, it is desired to reduce a vertical displacement difference between the built-in component and the rotor 3.

Therefore, in the rotary-machine casing support structure according to some embodiments, a vertical displacement difference between the built-in component and the rotor 3 is reduced as described below.

That is, as shown in FIGS. 2 to 5, a casing support structure 10 of the steam turbine 100 according to some embodiments is disposed on the casing 2 (external casing 201) and the internal space 203 of the casing 2 (external casing 201) on a lateral side of the rotor 3, and includes the built-in component 200 supported by the casing 2 (external casing 201), the protrusion portion 24 provided to protrude toward a lateral outer side (radially outer side) of the casing 2 (external casing 201) from a lateral side portion of the casing 2 (external casing 201), and the support portion (outer support portion 27) that supports the protrusion portion 24 on the lateral outer side of the casing 2 (external casing 201).

Figure 6:
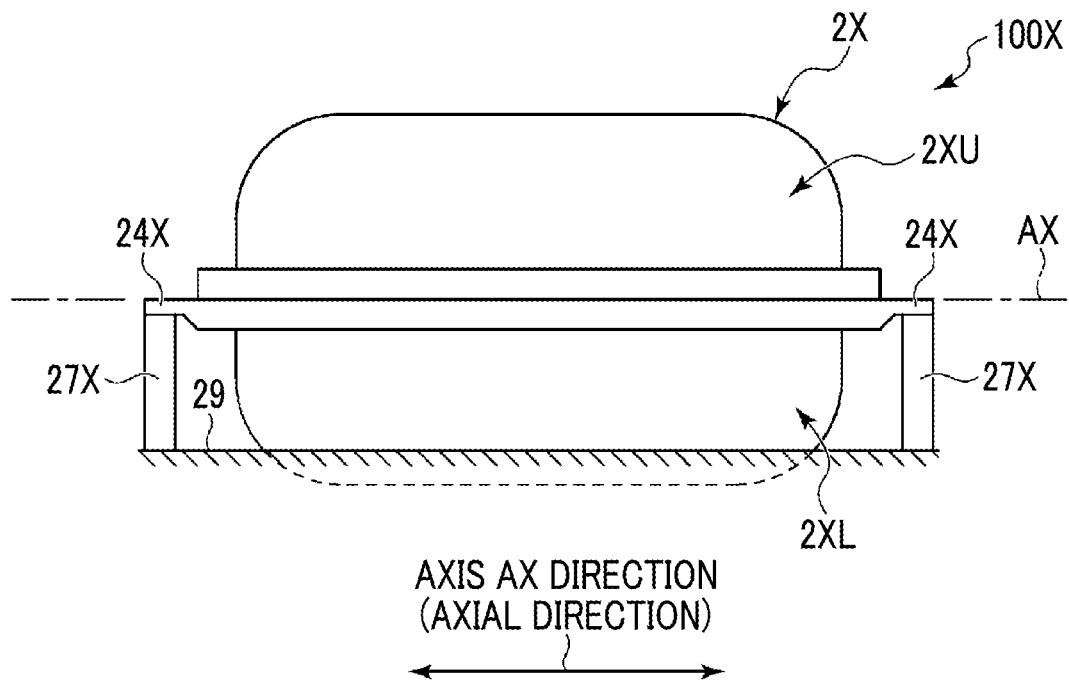
FIG. 6 is a diagram showing an example of a support structure for a rotary-machine casing support structure in the related art.

FIG. 6 is a diagram showing an example of a rotary-machine casing support structure in the related art. A steam turbine 100X as an example of the rotary machine in the related art shown in FIG. 6 includes a casing 2X divided into upper and lower portions and including a casing upper-half portion 2XU that is an upper half and a casing lower-half portion 2XL that is a lower half.

In the example shown in FIG. 6, each of protrusion portions 24X protrudes from both ends of the casing lower-half portion 2XL in the axis AX direction. The protrusion portion 24X is provided on each of a lateral outer side (radially outer side) on one side and a lateral outer side on the other side of the casing 2X.

In the example shown in FIG. 6, each of the four protrusion portions 24X is supported by a turbine pedestal 29 via support columns 27X, so that the casing 2X is supported by the turbine pedestal 29.

In a rotary-machine casing support structure in the related art, a protrusion portion 24X extending to a position distant from the casing 2X in the axis AX direction is supported by the support column 27X at the position distant from the casing 2X in the axis AX direction. Therefore, if the casing 2X is deformed to warp in the vertical direction due to the thermal t deformation, the casing 2X moves up and down with respect to the turbine pedestal 29 or the like supporting the casing 2X. As a result, a built-in component that is disposed in the internal space of the casing 2X, such as a blade ring, and that is supported by the casing 2X also moves up and down with respect to the turbine pedestal 29 or the like that supports the casing 2X. Therefore, a vertical displacement difference occurs with the rotor that is separately supported with respect to the turbine pedestal 29 or the like that supports the casing 2X, and the casing 2X comes into contact with the seal fins, or conversely, a clearance becomes excessive, so that shaft vibration or degradation in performance may occur.

If the casing 2 is deformed to warp in the vertical direction, the vertical displacement difference between the built-in component 200 and the rotor 3 increases as a support position of the protrusion portion 24 by the support portion (outer support portion 27) becomes farther from the casing 2 in the axis AX direction.

According to the casing support structure 10 according to some embodiments, the protrusion portion 24 and the support portion (outer support portion 27) approach the casing 2 in the axis AX direction as compared with the rotary-machine casing support structure in the related art. Accordingly, the vertical displacement difference between the built-in component 200 and the rotor 3 can be reduced as compared with the rotary-machine casing support structure in the related art. Therefore, shaft vibration due to contact with the seal fins is less likely to occur, and performance can be improved by reduction of a clearance between a rotating member (rotor 3 and rotating blade 30) and a stationary member (blade ring 212, high-pressure turbine blade ring 222, medium-pressure turbine blade ring 232, and stator vane 20).

For example, deformation due to thermal elongation of the casing 2 is assumed to cause the casing 2 to warp and protrude upward at a design stage. However, it also can be considered that the casing 2 may tend to actually warp and protrude downward, which is different from the assumption at the design stage.

Even in such a case, according to the casing support structure 10 according to some embodiments, since the vertical displacement difference between the built-in component 200 and the rotor 3 can be reduced, the shaft vibration by the contact with the seal fins is less likely to occur, and the performance can be improved by reducing the clearance between the rotating member and the stationary member, even if the deformation due to the thermal elongation of the casing 2 tends to be different from the assumption at the design stage.

The steam turbine 100 according to some embodiments includes the casing support structure 10 and the rotor 3 according to some embodiments.

Accordingly, the vertical displacement difference between the built-in component 200 and the rotor 3 can be reduced as compared with the rotary machine provided with the rotary-machine casing support structure in the related art. Therefore, in the steam turbine 100 according to some embodiments, the shaft vibration due to the contact with the seal fins is less likely to occur, and the performance can be improved by reducing the clearance between the rotating member and the stationary member.

In the casing support structure 10 according to some embodiments, the protrusion portion 24 and the outer support portion 27 may be provided at a position overlapping the built-in component 200 in the axis AX direction.

Accordingly, the vertical displacement difference between the built-in component 200 and the rotor 3 can be reduced as compared with the rotary-machine casing support structure in the related art.

In the casing support structure 10 according to some embodiments, the built-in component 200 may be supported by the casing 2 at two or more support positions that are different in position in the axis AX direction. The at least two support positions may include a first support position P1 that is positioned on the farthest one side in the axis AX direction and a second support position P2 that is positioned on the opposite farthest side. The protrusion portion 24 and the outer support portion 27 may be positioned between the first support position P1 and the second support position P2 in the axis AX direction.

For example, in the high-pressure turbine 100HP shown in FIG. 3A, the first support position P1 is, for example, a position in the axis AX direction of the inner support portion 25 that supports the internal casing protrusion portion 211P, and the second support position P2 is, for example, a position in the axis AX direction of the inner support portion 25 that supports the blade ring protrusion portion 212P.

For example, in the high-and-medium-pressure turbine 100HIP shown in FIG. 3B, the first support position P1 is, for example, a position in the axis AX direction of the inner support portion 25 that supports the blade ring protrusion portion 222P of the high-pressure turbine blade ring 222, and the second support position P2 is, for example, a position in the axis AX direction of the inner support portion 25 that supports the blade ring protrusion portion 232P of the medium-pressure turbine blade ring 232.

In a case where the casing 2 is deformed to warp in the vertical direction, the casing 2 is generally deformed to protrude most in the vertical direction in the vicinity of the center in the axis AX direction. Therefore, when the support position of the protrusion portion 24 by the outer support portion 27 approaches the center of the casing 2 the in axis AX direction, the vertical displacement difference between the center of the casing 2 and the support surface 27a where the outer support portion 27 supports the protrusion portion 24 from below is reduced.

Further, when the support position where the casing 2 supports the built-in component 200 and the support position of the protrusion portion 24 by the outer support portion 27 approach each other in the axis AX direction, even if the casing 2 is deformed to warp in the vertical direction, the vertical displacement difference between the built-in component 200 in the support position where the casing 2 supports the built-in component 200 and a support surface 27a where the outer support portion 27 supports the protrusion portion from below is reduced.

According to the casing support structure 10 according to some embodiments, the vertical displacement difference between the built-in component 200 and the rotor 3 can be reduced.

In the casing support structure 10 according to some embodiments, the protrusion portion 24 may include a first protrusion portion 241 and a second protrusion portion 242 that is spaced apart from the first protrusion portion 241 in the axis AX direction. At least one of the first protrusion portion 241 and the second protrusion portion 242 may overlap with a support position where the casing 2 supports the built-in component 200 in the axis AX direction.

For example, in the high-pressure turbine 100HP shown in FIG. 3A, the first protrusion portion 241 is, for example, a protrusion portion 24 that overlaps with the inner support portion 25 that supports the internal casing protrusion portion 211P in the axis AX direction, and the second protrusion portion 242 is, for example, a protrusion portion 24 that overlaps with the inner support portion 25 that supports the blade ring protrusion portion 212P in the axis AX direction. In the high-pressure turbine 100HP shown in FIG. 3A, in a case where any one of the first protrusion portion 241 and the second protrusion portion 242 overlaps with the inner support portion 25 in the axis AX direction, the other may not overlap with the inner support portion 25 in the axis AX direction.

For example, in the high-and-medium-pressure turbine 100HIP shown in FIG. 3B, the first protrusion portion 241 is, for example, the protrusion portion 24 that overlaps with the inner support portion 25 that supports the internal casing protrusion portion 221P in the axis AX direction, and with the inner support portion 25 that supports the blade ring protrusion portion 222P of the high-pressure turbine blade ring 222 axis AX direction.

In the high-and-medium-pressure turbine 100HIP shown in FIG. 3B, the second protrusion portion 242 is, for example, the protrusion portion 24 positioned in the vicinity of the inner support portion 25 that supports the blade ring protrusion portion 232P of the medium-pressure turbine blade ring 232.

In the high-and-medium-pressure turbine 100HIP shown in FIG. 3B, the first protrusion portion 241 may overlap, for example, with only one of the inner support portion 25 that supports the blade ring protrusion portion 222P of the high-pressure turbine blade ring 222, or the inner support portion 25 that supports the internal casing protrusion portion 221P in the axis AX direction.

According to the casing support structure 10 according to some embodiments, the vertical displacement difference between the built-in component 200 and the rotor 3 can be reduced.

In the high-and-medium-pressure turbine 100HIP shown in FIG. 3B, the second protrusion portion 242 does not overlap with the inner support portion 25 that supports the blade ring protrusion portion 232P of the medium-pressure turbine blade ring 232 in the axis AX direction, but may overlap with the inner support portion 25.

That is, in the casing support structure 10 according to some embodiments, the built-in component 200 may be supported by the external casing 201 at two or more support positions that are different in position in the axis AX direction. The first protrusion portion 241 and the second protrusion portion 242 may overlap with the at least two support positions in the axis AX direction.

As a result, the vertical displacement difference between the built-in component 200 and the rotor 3 can be reduced.

In the casing support structure 10 according to some embodiments, the external casing 201 may be dividable into a casing lower-half portion 2L and a casing upper-half portion 2U on the horizontal division surface Sd. The protrusion portion 24 may be provided on the casing upper-half portion 2U.

In general, the built-in component is supported by the casing at a height position close to the horizontal division surface of the casing. Therefore, when the support surface 27a on which the outer support portion 27 supports the protrusion portion 24 from below is spaced apart from the height position of the horizontal division surface Sd of the casing 2 (external casing 201), it becomes easier for the support surface 27a to be affected by thermal elongation of the member that is interposed between the casing 2 (external casing 201) and the support surface 27a in the height direction, and the vertical displacement difference between the support surface 27a and the horizontal division surface Sd tends to increase.

Therefore, in order to suppress the influence of such thermal elongation, it is desirable that the height positions of the support surface 27a and the horizontal division surface Sd are close to each other.

In addition, the support surface 27a on which the outer support portion 27 supports the protrusion portion 24 from below comes into contact with a lower surface of the protrusion portion 24. Therefore, in a case where the protrusion portion 24 is provided in the casing upper-half portion 2U, the support surface 27a can be easily brought close to the height position of the horizontal division surface Sd.

According to the casing support structure 10 according to some embodiments, since the protrusion portion 24 is provided on the casing upper-half portion 2U, it becomes easier to bring the support surface 27a close to the height position of the horizontal division surface Sd, and it becomes easier to reduce a vertical displacement difference between the support surface 27a and the horizontal division surface Sd.

In the casing support structure 10 according to some embodiments, the height position of the support surface 27a in the vertical direction may be substantially the same as the height position of the horizontal division surface Sd.

Note that the fact that the height position of the support surface 27a in the vertical direction is substantially the same as the height position of the horizontal division surface Sd includes, in addition to a case where the height position of the support surface 27a in the vertical direction is the height position of the horizontal division surface Sd, a case where the height position of the support surface 27a in the vertical direction deviates from the height position of the horizontal division surface Sd to such an extent that the vertical displacement difference between the built-in component 200 and the rotor 3 caused by a tolerance, or the effect of the thermal elongation of the height direction of the member interposed between the casing 2 (external casing 201) and the support surface 27a is negligible.

As a result, a vertical displacement difference between the support surface 27a and the horizontal division surface Sd can be further reduced.

In the casing support structure 10 according to some embodiments, the vertical displacement difference between the built-in component 200 and the rotor 3 may be appropriately adjusted by providing a temperature control device such as a heater in the outer support portion 27 and controlling the height position of the support surface 27a of the outer support portion 27 in the vertical direction.

For example, as shown in FIG. 2, it is preferable that the casing support structure 10 according to some embodiments includes a heater 51 for heating the outer support portion 27 and a heater control device 53 for controlling the heater 51. In addition, it is preferable that the casing support structure 10 according to some embodiments includes a temperature sensor 55 for measuring the temperature of the outer support portion 27.

The heater control device 53 is a control device configured to be able to control electric power supplied to the heater 51 based on the temperature of the outer support portion 27 measured by the temperature sensor 55.

In the casing support structure 10 according to some embodiments, the temperature of the outer support portion 27 is appropriately controlled by the heater 51 to adjust the thermal elongation of the outer support portion 27, so that the height position of the support surface 27a of the outer support portion 27 can be adjusted. As a result, the height position of the built-in component 200 can be controlled by controlling the temperature of the outer support portion 27 via the heater 51. Therefore, the vertical displacement difference between the built-in component 200 and the rotor 3 can be reduced.

In the casing support structure 10 according to some embodiments, the casing 2 may be the external casing 201, and the built-in component 200 may include an internal casing (internal casing 211, high-pressure turbine internal casing 221).

As a result, in the steam turbine 100 including the external casing 201 and the internal casing (internal casing 211, high-pressure turbine internal casing 221), the vertical displacement difference between the built-in component 200 and the rotor 3 can be reduced as compared with the rotary-machine casing support structure in the related art.

In the steam turbine 100 according to some embodiments, the casing 2 is thermally elongated in the axial direction as well. Therefore, it is preferable to set a restriction position for restricting a movement of the casing 2 in the axial direction of the casing 2 on the end portion on one side in the axial direction of the casing 2. For example, it is preferable that the restriction position for restricting the movement of the casing 2 in the axial direction is set on the end portion on which the thrust bearing 4B (refer to FIG. 1) for restricting a movement of the rotor 3 in the axial direction is provided, among both end portions in the axial direction of the casing 2.

Specifically, for example, as shown in FIG. 2, it is preferable that a centering beam 61 is provided on the end portion on which the thrust bearing 4B (refer to FIG. 1) for restricting the movement of the rotor 3 in the axial direction is provided, among both end portions in the axial direction of the casing 2. In the centering beam 61, an end portion on one side in the axial direction is connected to the casing 2, and an end portion on the other side is connected to, for example, the thrust bearing 4B. The thrust bearing 4B may be movable in the axial direction with respect to the turbine pedestal 29, or may be immovable in the axial direction with respect to the turbine pedestal 29.

Therefore, in a case where the casing 2 is thermally elongated in the axial direction, the casing 2 and the rotor 3 move in the same direction with respect to the thrust bearing 4B. Therefore, it is possible to reduce the probability that the rotating member (rotor or rotating blade) and the stationary member (a blade ring or a stator vane) come into contact with each other in the axial direction.

In the casing support structure 10 according to some embodiments, the outer support portion 27 is configured not to restrict a movement of the protrusion portion 24 in the axial direction.

The present disclosure is not limited to the above-described embodiments, and includes a modification of the above-described embodiments and an appropriate combination of the embodiments.

For example, in the steam turbine 100 according to some of the above-described embodiments, the outside of the casing 2 is surrounded by a heat insulating member (not shown). Therefore, in the casing support structure 10 according to some embodiments, the outer support portion 27 may be surrounded by the heat insulating member (not shown) together with the casing 2, and the outer support portion 27 may be disposed outside the heat insulating member surrounding the casing 2.

The steam turbine 100 according to some embodiments may be a medium-pressure turbine. In addition, the steam turbine 100 according to some embodiments may be a low-pressure turbine or a medium-and-low-pressure turbine.

Furthermore, the rotary machine according to some embodiments is not limited to the steam turbine 100, and may be a rotary machine that is operated under a high temperature, such as a gas turbine.

For example, the contents described in each embodiment are understood as follows.

(1) A rotary-machine casing support structure according to at least one embodiment of the present disclosure includes a casing 2 (external casing 201), a built-in component 200 that is disposed inside of an internal space 203 of the casing 2 (external casing 201) at a lateral side of a rotor 3 and that is supported by the casing 2 (external casing 201), a protrusion portion 24 that is provided to protrude laterally outside (radially outside) of the casing 2 (external casing 201) from a lateral side portion of the casing 2 (external casing 201), and a support portion (outer support portion 27) that supports the protrusion portion 24 laterally outside of the casing 2 (external casing 201).

According to the above configuration of (1), as compared with the rotary-machine casing support structure in the related art, the protrusion portion and the support portion approach the casing in the extending direction of the rotor. As a result, a vertical displacement difference between the built-in component and the rotor can be reduced as compared with a rotary-machine casing support structure in the related art. Therefore, shaft vibration due to contact with the seal fins is less likely to occur, and performance can be improved by reducing a clearance between a rotating member (rotor or rotating blade) and a stationary member (blade ring or stator vane).

(2) In some embodiments, in the above configuration of (1), the protrusion portion 24 and the support portion (outer support portion 27) may be provided at positions overlapping with the built-in component 200 and in an extending direction (axis AX direction) of the rotor 3.

According to the above configuration of (2), a vertical displacement difference between the built-in component 200 and the rotor 3 can be reduced as compared with a rotary-machine casing support structure in the related art.

(3) In some embodiments, in the above configuration of (1) or (2), the built-in component 200 may be supported by the casing 2 (external casing 201) at two or more support positions that are different in position in an extending direction (axis AX direction) of the rotor 3. The at least two support positions may include a first support position P1 that is positioned on a farthest one side in the extending direction (external casing 201) of the rotor and a second support position P2 that is positioned on an opposite farthest side. The protrusion portion 24 and the support portion (outer support portion 27) may be positioned between the first support position P1 and the second support position P2 in the extending direction (axis AX direction) of the rotor.

According to the above configuration of (3), the vertical displacement difference between the built-in component and the rotor can be reduced.

(4) In some embodiments, in any of the above configurations of (1) to (3), the protrusion portion 24 may include a first protrusion portion 241, and a second protrusion portion 242 spaced apart from the first protrusion portion 241 in an extending direction (axis AX direction) of the rotor 3. At least one of the first protrusion portion 241 or the second protrusion portion 242 may overlap, in the extending direction (axis AX direction) of the rotor 3, with a support position at which the casing 2 (external casing 201) supports the built-in component 200.

According to the above configuration of (4), the vertical displacement difference between the built-in component 200 and the rotor 3 can be reduced.

(5) In some embodiments, in the above configuration of (4), the built-in component 200 may be supported by the casing 2 (external casing 201) at two or more support positions that are different in position in an extending direction (axis AX direction) of the rotor 3. The first protrusion portion 241 and the second protrusion portion 242 may overlap with the at least two support positions in the extending direction (axis AX direction).

According to the above configuration of (5), the vertical displacement difference between the built-in component 200 and the rotor 3 can be reduced.

(6) In some embodiments, in any of the above configurations of (1) to (5), the casing 2 (external casing 201) may be dividable into a casing lower-half portion 2L and a casing upper-half portion 2U on a horizontal division surface Sd. The protrusion portion 24 may be provided on the casing upper-half portion 2U.

According to the above configuration of (6), since the support surface 27a is easily brought close to the height position of the horizontal division surface Sd, it is easier to reduce a vertical displacement difference between the support surface 27a and the horizontal division surface Sd.

(7) In some embodiments, in the above configuration of (6), the support portion (outer support portion 27) may have a support surface 27a that supports the protrusion portion 24 from below. A height position of the support surface 27a in a vertical direction may be substantially the same as a height position of the horizontal division surface Sd.

According to the above configuration of (7), the vertical displacement difference between the support surface 27a and the horizontal division surface Sd can be easily reduced.

(8) In some embodiments, any of the above configurations of (1) to (7) may be provided with a heater 51 for heating the support portion (outer support portion 27), and a heater control device 53 that controls the heater 51.

According to the above configuration of (8), the temperature of the support portion (outer support portion 27) is controlled by the heater 51, so that the height position of the support surface 27a that supports the protrusion portion 24 from below can be adjusted in the support portion (outer support portion 27). As a result, the height position of the built-in component 200 can be controlled by controlling the temperature of the support portion (outer support portion 27) via the heater 51. Therefore, the vertical displacement difference between the built-in component 200 and the rotor 3 can be reduced.

(9) In some embodiments, in any of the above configurations of (1) to (8), the casing 2 may be an external casing 201, and the built-in component 200 may include an internal casing (internal casing 211, high-pressure turbine internal casing 221).

According to the above configuration of (9), in the rotary machine (steam turbine 100) including the external casing 201 and the internal casing (internal casing 211, high-pressure turbine internal casing 221), the vertical displacement difference between the built-in component 200 and the rotor 3 can be reduced as compared with the rotary-machine casing support structure in the related art.

(10) The rotary machine according to at least one embodiment of the present disclosure includes the rotary-machine casing support structure 10 of any one of the above configurations of (1) to (9), and the rotor 3.

According to the above configuration of (10), a vertical displacement difference between the built-in component 200 and the rotor 3 can be reduced as compared with a rotary machine provided with a rotary-machine casing support structure in the related art. Therefore, shaft vibration due to contact with the seal fins is less likely to occur, and performance can be improved by reducing a clearance between the rotating member and the stationary member.

REFERENCE SIGNS LIST

- 1: rotary shaft
- 2: casing
- 2U: casing upper-half portion
- 2L: casing lower-half portion
- 3: rotor
- 10: casing support structure
- 24: protrusion portion
- 25: inner support portion
- 27: outer support portion (support portion)
- 27a: support surface
- 29: turbine pedestal
- 100: steam turbine
- 100HP: high-pressure turbine
- 100HIP: high-and-medium-pressure turbine
- 200: built-in component
- 201: external casing
- 203: internal space
- 211: internal casing
- 212: blade ring
- 213: dummy ring
- 221: high-pressure turbine internal casing
- 222: high-pressure turbine blade ring
- 223: first dummy ring
- 232: medium-pressure turbine blade ring
- 241: first protrusion portion
- 242: second protrusion portion

The invention claimed is:

1. A rotary-machine casing support structure comprising:
    a casing having a casing upper-half portion and a casing lower-half portion;
    a built-in component that is disposed inside of an internal space of the casing at a lateral side of a rotor and that is supported by the casing;
    a protrusion portion that is provided to protrude laterally outside of the casing from a lateral side portion of the casing; and
    a support portion that supports the protrusion portion laterally outside of the casing,
    wherein the casing lower-half portion has an inner support portion formed to protrude toward an inside in a radial direction of the rotor,
    wherein the built-in component has a built-in component upper-half portion and a built-in component lower-half portion,
    wherein the built-in component upper-half portion has a protrusion portion of the built-in component that protrudes toward an outside in the radial direction of the rotor, and
    wherein the built-in component is supported by the inner support portion at the protrusion portion of the built-in component.

2. The rotary-machine casing support structure according to claim 1,
    wherein the protrusion portion and the support portion are provided at positions overlapping with the built-in component in an extending direction of the rotor.

3. The rotary-machine casing support structure according to claim 2,
    wherein the built-in component is supported by the casing at two or more support positions that are different in position in the extending direction of the rotor,
    the at least two support positions include a first support position that is positioned on a farthest one side in the extending direction of the rotor and a second support position that is positioned on an opposite farthest side, and
    the protrusion portion and the support portion are positioned between the first support position and the second support position in the extending direction of the rotor.

4. The rotary-machine casing support structure according to claim 1,
    wherein the protrusion portion includes
    a first protrusion portion, and
    a second protrusion portion spaced apart from the first protrusion portion in an extending direction of the rotor, and
    at least one of the first protrusion portion or the second protrusion portion overlaps, in the extending direction of the rotor, with a support position at which the casing supports the built-in component.

5. The rotary-machine casing support structure according to claim 4,
wherein the built-in component is supported by the casing at two or more support positions that are different in positions in an extending direction of the rotor, and
the first protrusion portion and the second protrusion portion overlap with the at least two support positions in the extending direction of the rotor.

6. The rotary-machine casing support structure according to claim 1,
wherein the protrusion portion is provided in the casing upper-half portion.

7. The rotary-machine casing support structure according to claim 6,
wherein the support portion has a support surface supporting the protrusion portion from below, and
a height position of the support surface in a vertical direction is substantially the same as a height position of the horizontal division surface.

8. The rotary-machine casing support structure according to claim 1, further comprising:
a heater for heating the support portion; and
a heater control device that controls the heater.

9. The rotary-machine casing support structure according to claim 1, wherein the casing is an external casing, and
the built-in component includes an internal casing.

10. A rotary machine comprising:
the rotary-machine casing support structure according to claim 1 and
the rotor.

\* \* \* \* \*